United States Patent [19]

Pickett et al.

[11] Patent Number: 5,318,850
[45] Date of Patent: Jun. 7, 1994

[54] UV CURABLE ABRASION-RESISTANT COATINGS WITH IMPROVED WEATHERABILITY

[75] Inventors: James E. Pickett, Schenectady; Gautam A. Patel, Clifton Park, both of N.Y.

[73] Assignee: General Electric Company, Schenectady, N.Y.

[21] Appl. No.: 918,531

[22] Filed: Jul. 29, 1992

Related U.S. Application Data

[63] Continuation-in-part of Ser. No. 799,220, Nov. 27, 1991.

[51] Int. Cl.⁵ .......................... C08F 2/50; B32B 9/04; B32B 27/36; C08K 3/36
[52] U.S. Cl. ................................. 428/412; 428/447; 522/64; 522/83; 522/84; 522/85; 522/99
[58] Field of Search .................. 522/83, 84, 99, 64, 522/85; 428/412, 447

[56] References Cited

U.S. PATENT DOCUMENTS

| | | | |
|---|---|---|---|
| 4,254,248 | 3/1981 | Friends et al. | 526/279 |
| 4,298,738 | 11/1981 | Lechtken et al. | 546/22 |
| 4,339,474 | 7/1982 | Kishida et al. | 427/54.1 |
| 4,387,240 | 6/1983 | Berg | 556/440 |
| 4,478,876 | 10/1984 | Chung | 428/412 |
| 4,486,504 | 12/1984 | Chung | 428/412 |
| 4,491,508 | 1/1985 | Olson et al. | 428/412 |
| 4,614,777 | 9/1986 | Kania | 526/279 |
| 5,214,085 | 5/1993 | Patel et al. | 428/412 |
| 5,258,225 | 11/1993 | Katsamberis | 428/412 |

FOREIGN PATENT DOCUMENTS

0383074  1/1990  European Pat. Off. .

Primary Examiner—Susan Berman
Attorney, Agent, or Firm—William A. Teoli; William H. Pittman

[57] ABSTRACT

UV curable hardcoat compositions are provided which impart improved abrasion resistance to thermoplastic substrates when applied and cured thereon. Enhancement in abrasion and weathering properties have been achieved by the use of certain UV curable branched or carbocyclic monoacrylates, such as isobornyl acrylate.

5 Claims, No Drawings

UV CURABLE ABRASION-RESISTANT COATINGS WITH IMPROVED WEATHERABILITY

CROSS REFERENCE TO RELATED APPLICATION

This application is a continuation-in-part of copending application Ser. No. 07/799,220, filed Nov. 27, 1991.

BACKGROUND OF THE INVENTION

The present invention relates to UV curable hardcoat compositions which are useful for imparting abrasion resistance and improved weathering resistance to thermoplastic substrates when applied and cured thereon. More particularly, the present invention relates to UV curable mixtures of a monofunctional branched or carbocyclic acrylate, such as isobornyl acrylate, which is used in combination with hexanediol diacrylate, colloidal silica, the hydrolysis product of an alkoxysilyl acrylate and an effective amount of a UV photoinitiator.

Prior to the present invention, as shown by Olson et al, U.S. Pat. No. 4,455,205, acrylic monomer, such as hexanediol diacrylate was utilized in combination with a UV photoinitiator, colloidal silica and an alkoxysilyl acrylate of the formula,

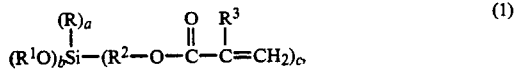

where R is a $C_{(1-13)}$ monovalent hydrocarbon radical, $R^1$ is a $C_{(1-8)}$ alkyl radical, $R^2$ is a divalent $C_{(2-8)}$ alkylene radical, $R^3$ is a monovalent radical selected from hydrogen and a $C_{(1-8)}$ alkyl radical, a is a whole number equal to 0 or 1, b is an integer equal to 1 to 3 inclusive, c is an integer equal to 1 to 3 inclusive, and the sum of a +b +c is equal to 4. Although the UV curable hardcoat compositions of Olson et al have been found to provide adherent and abrasion resistant coatings on thermoplastic substrates when cured, and the cured coated articles have been found to have improved weathering resistance, additional hardcoat compositions having increased abrasion and weathering resistance are constantly being sought by the plastics industry.

SUMMARY OF THE INVENTION

The present invention is based on the discovery that UV curable coating compositions capable of providing hardcoats on thermoplastic substrates which show improved weathering resistance while maintaining abrasion resistance, can be made by utilizing in the hardcoat formulation, a monofunctional branched or carbocyclic acrylate, such as isobornyl acrylate, in combination with hexanediol diacrylate. The resulting UV curable coating compositions have been found to provide coated thermoplastic articles having superior weathering resistance while maintaining abrasion resistance generally shown by commercially available UV cured hardcoat compositions.

STATEMENT OF THE INVENTION

There is provided by the present invention, a UV curable hardcoat composition comprising by weight, (A) 1% to 60% of colloidal silica, (B) 1% to 50% of the hydrolysis product of an alkoxysilyl acrylate of formula (1), (C) 25% to 90% of acrylate monomer consisting essentially of a mixture of 20 wt. % to 90 wt. % of hexanediol diacrylate and 10 wt. % to 80 wt. % of a monofunctional branched or carbocyclic acrylate selected from the class consisting of isobornyl acrylate, cyclohexyl acrylate, 1-adamantyl acrylate, tert-butyl acrylate, 2-ethylhexyl acrylate, dicyclopentenyl acrylate and a mixture thereof, and (D) an effective amount of a photoinitiator.

Radicals included within R of formula (1) are for example, $C_{(1-8)}$ alkyl radicals such as methyl, ethyl, propyl, butyl, pentyl, hexyl; $C_{(6-13)}$ aryl radicals, such as phenyl, tolyl, xylyl, chlorophenyl. Radicals included within $R^1$ are for example, $C_{(1-8)}$ alkyl radicals defined by R. Radicals included within $R^2$ are $C_{(2-8)}$ divalent alkylene radicals such as dimethylene, trimethylene, tetramethylene. Radicals included within $R^3$ are for example, hydrogen, and $C_{(1-8)}$ alkyl radicals as previously defined for R.

Included within the alkoxysilyl acrylates of formula (1) are compounds having the formulas $$CH_2\!\!=\!\!CCH_3CO_2\!\!-\!\!CH_2CH_2\!\!-\!\!Si(OCH_2CH_3)_3,$$

$$CH_2\!\!=\!\!CHCO_2\!\!-\!\!CH_2CH_2\!\!-\!\!Si(OCH_3)_3,$$

$$CH_2\!\!=\!\!CCH_3CO_2\!\!-\!\!CH_2CH_2CH_2\!\!-\!\!Si(OCH_2CH_3)_3,$$

$$CH_2\!\!=\!\!CHCO_2\!\!-\!\!CH_2CH_2\!\!-\!\!Si(OCH_2CH_3)_3,$$

$$CH_2\!\!=\!\!CCH_3CO_2\!\!-\!\!CH_2CH_2CH_2\!\!-\!\!Si(OCH_3)_3,$$

$$CH_2\!\!=\!\!CHCO_2\!\!-\!\!CH_2CH_2CH_2\!\!-\!\!Si(OCH_3)_3,$$

$$CH_2\!\!=\!\!CCH_3CO_2\!\!-\!\!CH_2CH_2CH_2\!\!-\!\!Si(OCH_2CH_3)_3,$$

$$CH_2\!\!=\!\!CHCO_2\!\!-\!\!CH_2CH_2CH_2\!\!-\!\!Si(OCH_2CH_3)_3,$$

$$CH_2\!\!=\!\!CCH_3CO_2\!\!-\!\!CH_2CH_2CH_2CH_2\!\!-\!\!Si(OCH_3)_3,$$

$$CH_2\!\!=\!\!CHCO_2\!\!-\!\!CH_2CH_2CH_2CH_2\!\!-\!\!Si(OCH_3)_3,$$

$$CH_2\!\!=\!\!CCH_3CO_2\!\!-\!\!CH_2CH_2CH_2CH_2\!\!-\!\!Si(OCH_2CH_3)_3,$$

$$CH_2\!\!=\!\!CHCO_2\!\!-\!\!CH_2CH_2CH_2CH_2\!\!-\!\!Si(OCH_2CH_3)_3, \text{ etc.}$$

The colloidal silica useful in the hardcoat compositions is a dispersion of submicron-sized silica ($SiO_2$) particles in an aqueous or other solvent medium. Dispersions of colloidal silica are available from chemical manufacturers such as E. I. DuPont de Nemours Co. and Nalco Chemical Company. The colloidal silica is available in either acidic or basic form. However, for purposes of the present invention, the acidic is preferred. It has been found that superior hardcoat properties can be achieved with acidic colloidal silica (i.e. dispersions with low sodium content). Alkaline colloidal silica also may be converted to acidic colloidal silica with additions of acids such as HCl or $H_2SO_4$ along with high agitation.

An example of a satisfactory colloidal silica which can be used is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight. For example, 520 grams of Nalcoag 1034A colloidal silica is, approximately, 177 grams of $SiO_2$ by weight.

A further description of colloidal silica can be found in U.S. Pat. No. 4,027,073.

The hardcoat compositions also can contain a photosensitizing amount of photoinitiator, i.e., an amount effective to effect the photocure of the coating composition. Generally, this amount is from about 0.01% to about 10% by weight, and preferably from about 0.1% to about 5% by weight of the photocurable coating composition.

As shown in U.S. Pat. No. 4,478,876, Rack Chung, certain blends of ketone-type and amine type photoinitiators are effective for crosslinking the above described coating compositions in air to form suitable hard coatings upon exposure to UV radiation.

Other ketone-type photoinitiators which preferably are used in a nonoxidizing atmosphere, such as nitrogen, are those selected from the group consisting of:

benzophenone, and other acetophenones,
benzil, benzaldehyde and o-chlorobenzaldehyde,
xanthone,
thioxanthone,2-chlorothioxanthone,
9,10-phenanthrenenquinone,
9,10-anthraquinone,
methylbenzoin ether,
ethylbenzoin ether,
isopropylbenzoin ether,
α,α-diethoxyacetophenone,
α,α-dimethoxyacetophenone,
1-phenyl-1,2-propanediol-2-o-benzoyl oxime, and
α,α-dimethoxy-α-phenylacetopheone.

In addition, acylphosphorus compounds can be used as photoinitiators such as, 2,4,6-triorganobenzoyldiarylphosphine oxides, 2,4,6-trimethylbenzoyldiphenylphosphine oxide and 2,4,6-triethylbenzoyldinaphthylphosphine oxide; 2,4,6-triorganobenzoyl diorganophosphonates, such as, 2,4,6-trimethylbenzoyl diethylphosphonate and 2,4,6-triethylbenzoyl diphenylphosphonate; 2,4,6-triorganobenzoyldiarylphosphine sulfides, such as 2,4,6-trimethylbenzoyldiphenylphosphine sulfide.

The hardcoat compositions of the present invention can also contain UV absorbers or stabilizers such as resorcinol monobenzoate, 2-methyl resorcinol dibenzoate, 2-hydroxy-4-octyloxy benzophenone and other benzophenone-type absorbers, 2-(2'-hydroxy-5'-toctylphenyl)benzotriazole and other benzotriazole-type absorbers, 2-hydroxy-4-octyloxy phenyl-diaryl triazines, etc. Hindered amine light stabilizers also can be added. The stabilizers can be present in the hardcoat composition at from about 0.1 to 15 weight percent, and preferable from about 3 to 15 weight percent.

The UV curable hardcoat compositions of the present invention also can contain various flatting agents surface active agents, thixotropic agents, UV light stabilizers and dyes.

Some of the surface-active agents which can be used include anionic, cationic and nonionic surface-active agents which are shown in Kirk-Othmer Encyclopedia of Chemical Technology, Vol. 19, Interscience Publishers, N.Y. 1969, pp. 507-593, and Encyclopedia of Polymer Science and Technology, Vol. 13, Interscience Publishers, N.Y., 1970, pp. 477-486, both of which are incorporated herein by reference.

In the practice of the present invention, the UV curable hardcoat composition can be made by blending together the aqueous colloidal silica, the alkoxysilyl acrylate, the hexanediol diacrylate, monoacrylate, the UV photosensitizer, and optionally any of the other aforementioned additives. In a typical blending procedure, the alkoxysilyl acrylate can be hydrolyzed in the presence of aqueous colloidal silica and a water miscible alcohol. In another procedure, the aqueous colloidal silica can be added to the alkoxysilyl acrylate after it has been hydrolyzed in aqueous alcohol. Suitable alcohols include, for example, any water miscible alcohol, for example, methanol, ethanol, propanol, butanol, etc, or ether alcohols, such as ethoxyethanol, butoxyethanol, methoxypropanol, etc. In a further procedure, aqueous colloidal silica and the alkoxysilyl acrylate can be combined and stirred until hydrolysis has been effected. The hydrolysis of the alkoxysilyl acrylate can be accomplished at ambient conditions, or can be effected by heating the hydrolysis mixture to reflux for a few minutes.

Although the order of addition of the various ingredients in the UV curable hardcoat compositions of the present invention is not critical, it is preferred to add the hexanediol diacrylate or "HDDA" and monoacrylate, or mixture thereof, to the above described mixture of hydrolyzed alkoxysilyl acrylate and colloidal silica. Preferably, the HDDA, monoacrylate monomer, or mixtures thereof is added to the mixture of alkoxysilyl acrylate and colloidal silica while it is stirring in a suitable hydrolysis medium, such as an aqueous solution of a water miscible alcohol as previously described.

The UV curable hardcoat composition of the present invention also can be made free of solvent by distilling an azeotropic mixture of water and alcohol from the formulation. In instances where no alcohol is utilized in the initial hydrolysis mixture, sufficient alcohol can be added to facilitate the removal of water by distillation. Other azeotrope solvents, for example, toluene, or other aromatic hydrocarbons, also can be used.

It has been found that at least one part of alkoxysilyl acrylate per 10 parts of $SiO_2$ should be used in the UV curable hardcoat composition to minimize the formation of gel.

The hard coat compositions of the present invention are based in part on silicon-containing ingredients and involve the condensation of colloidal silica and the alkoxysilyl acrylate. A variation in the silicon content of the hardcoat compositions have been found to influence such physical properties as the abrasion resistance of the resulting hardcoat. Additional properties, for example, the adhesion lifetime of the hardcoat on a thermoplastic substrate can also be enhanced by optimizing the formulation of the UV curable hardcoat composition. Suitable thermoplastic substrates which can be utilized in the practice of the present invention to produce shaped thermoplastic articles having enhanced abrasion resistance are, for example, Lexan polycarbonate, Valox polyester, Mylar polyester, Ultem polyetherimide, PPO polyphenyleneoxide, polymethylmethacrylate, etc., metals such as steel, aluminum, metallized thermoplastics, etc.

In order that those skilled in the art will be better able to practice the invention, the following examples are given by way of illustration and not by way of limitation. All parts are by weight.

EXAMPLE 1

There was added 17.5 g of 3-methacryloyloxypropyl trimethoxysilane to a mixture of 117 g of Nalco 1034A available from Nalco Chemical Company, Chicago, Ill., having 34% $SiO_2$ in water and 760 mL of reagent isopropyl alcohol. The mixture was allowed to stir for about 12 hours. There were then added to the resulting mixture, 48.75 g of isobornyl acrylate and 0.025 g of 4-methoxyphenol, and the volatiles were removed using a rotary evaporator equipped with a slow air bleed. The temperature of the mixture was 60° C. and it was subjected to a partial vacuum. There was obtained 104 g of a free-flowing liquid.

The above procedure was repeated except that in place of the isobornyl acrylate there was used hexanediol diacrylate.

A series of coating resins were prepared by blending the above-described isobornyl acrylate master batch and the hexanediol diacrylate master batch over a wide range of proportions. There was added to 100 parts of the respective resin blends, 3.5 parts of Cyasorb 5411 of American Cyanamid Co., which is 2-(2'- hydroxy-5'-t-octylphenyl)benzotriazole, 3.5 parts of Tinuvin 238 of Ciba Geigy Co. which is 2-(2'-hydroxy-3', 5'-di-t-amylphenyl)benzotriazole, and 2 parts of Lucirin TPO which is trimethylbenzoyl diphenylphosphineoxide of BASF, West Germany. The coatings were applied by the cold cast process at 20 ft/min at 110° F. to 15 mil unstabilized Lexan polycarbonate film using Ashdee medium pressure mercury lamps to effect cure. The uncured coating resin was applied to the surface of the polycarbonate film and air was expelled from the coating. The coating was then cured through the film surface opposite the coated surface while in contact with a smooth surface such as polished chrome or plastic. The thicknesses of the coatings were determined by UV measurements, the Taber abrasion values were determined by measuring the change in haze (Δ % H) using a Gardner model XL-835 Haze meter before and after 500 cycles of abrasing on a Model 174 Taber abraser equipped with CS-10F wheels and 500 g weights and the samples were subjected to weathering in an Atlas Ci35$_a$ weatherometer. The following results were obtained where exposure to fail is shown in terms of exceeding a yellow index "YI" of greater than 5, a haze greater than 10%, delamination and microcracking were measured in KJoules/m² at 340nm, HDDA is hexanediol diacrylate and IBA is isobornyl acrylate.

TABLE 1

| HDDA:IBA | Taber | Thickness | Microcrack | YI > 5 | Haze > 10 | Delamination |
|---|---|---|---|---|---|---|
| 100:0 | 7.6 | 4.7 microns | 3400 | 4270 | 5000 | 5600 |
| 90:10 | 7.1 | 4.3 | 3400 | 4270 | 5000 | 5600 |
| 80:20 | 5.6 | 4.2 | 4930 | 4000 | 4500 | 5600 |
| 70:30 | 8.2 | 4.6 | 6280 | 4800 | 6800 | 5600 |
| 60:40 | 9.4 | 4.7 | 7630 | 5500 | 8400 | 8300 |
| 50:50 | 8.1 | 5.0 | 9100 | 6300 | 8600 | 9100 |
| 25:75 | 24 | 5.8 | >9100 | 8100 | >9100 | >9100 |

Coatings made with isobornyl acrylate and HDDA Exposure to fail (KJoules/m² at 340 nm)

The above results show that increasing the fraction of IBA in the coating up to 50% does not adversely affect the abrasion resistance. The weathering is improved over the control at fractions greater than 10%.

Additional compositions were prepared using HDDA in combination with lauryl acrylate, and HDDA in combination with tetrahydrofurfuryl acrylate. It was found that coatings made by replacing the HDDA with lauryl acrylate generally had inferior abrasion resistance and weatherability. In addition, although the use of tetrahydrofurfuryl acrylate in combination with HDDA provided cured coatings that did not impair Taber abrasion values, the weathering performance was not improved by the replacement of HDDA with the tetrahydrofurfuryl acrylate.

EXAMPLE 2

A master batch for the hardcoat compositions was prepared in accordance with the procedure of example 1, except that only 28.8 g of HDDA was used resulting in a resin formulation that contained 50 pph of colloidal silica. There was then added to 10 g of the master batch, 2.5 g of a particular monoacrylate to provide a composition containing 40 pph colloidal silica in which the acrylate blend was 60 wt. % HDDA and 40 wt. % of monoacrylate. The respective blends were then further formulated with the same UV screen and photoinitiator to provide a series of UV curable hardcoat formulations. These UV curable hardcoat formulations were then applied to polycarbonate films, cured, and evaluated as shown by Table 1. The following results were obtained:

TABLE 2

Coatings made with 60/40 HDDA/monoacrylate Exposure to fail (KJoules/m² at 340 nm)

| Acrylate | Taber | Thickness | Microcrack | YI > 5 | Haze > 10 | Delamination |
|---|---|---|---|---|---|---|
| HDDA | 7.3 | 7.2 μm | 4000 | 6400 | 4700 | — |
| IBA | 9.7 | 7.2 | 7150 | 7500 | 7600 | — |
| CHA | 7.7 | 6.6 | 4800 | 6900 | 6900 | — |
| tBA | 13.2 | 6.2 | 6400 | 5800 | 7200 | — |
| Ada | 10.2 | 8.1 | 7150 | >8000 | >8000 | — |
| LA | 30.0 | 6.8 | 2400 | 7400 | 5500 | — |
| EHA | 13.5 | 5.1 | 3200 | 3800 | — | 4800 |
| DCPA | 9.4 | 9.0 | 2400 | 3600 | 2500 | — |

Code:
HDDA: Hexanediol diacrylate (control)
IBA: Isobornyl acrylate
CHA: Cyclohexyl acrylate
tBA: t-Butyl acrylate
AdA: 1-Adamantyl acrylate
LA: Lauryl acrylate
EHA: 2-Ethylhexyl acrylate
DCPA: Dicyclopentenyl acrylate The above results show that linear monoacrylate (LA) was not suitable for imparting a satisfactory degree of Taber abrasion and weathering to the polycarbonate substrate when cured, while branched or carbocyclic acrylates gave satisfactory Taber abrasion values of less than 15% haze.

Although the above example is directed to only a few of the very many variables which can be used in the present invention, it should be understood that the present invention is directed to a much broader variety of UV curable hardcoat compositions as set forth in the description preceding this example.

What is claimed is:
1. A UV curable hardcoat composition comprising by weight,
(A) 1% to 60% of colloidal silica,
(B) 1% to 50% of the hydrolysis product of an alkoxysilyl acrylate of the formula,

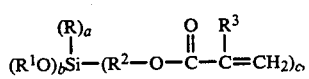

(C) 25% to 90% of acrylate monomer consisting essentially of a mixture of 20 wt. % to 90 wt. % of hexanediol diacrylate and 10 wt. % to 80 wt. % of a monofunctional acrylate selected from the group consisting of isobornyl acrylate, cyclohexyl acrylate, and 1-adamantyl acrylate, and (D) an effective amount of a photoinitiator, where R is a $C_{(1-13)}$ monovalent hydrocarbon radical, $R^1$ is a $C_{(1-8)}$ alkyl radical, $R^2$ is a divalent $C_{(2-8)}$ alkylene radical, $R^3$ is a monovalent radical selected from hydrogen and a $C_{(1-8)}$ alkyl radical, a is a whole number equal to 0 or 1, b is an integer equal to 1 to 3 inclusive, c is an integer equal to 1 to 3 inclusive, and the sum of a+b+c is equal to 4.

2. A UV curable hardcoat composition in accordance with claim 1, where the alkoxysilyl acrylate is 3-methacryloyloxypropyl trimethoxysilane.

3. A UV curable hardcoat composition in accordance with claim 1, where the UV photoinitiator is 2,4,6-trimethylbenzoyl diphenyl phosphine oxide.

4. A thermoplastic substrate coated with a UV cured hardcoat of the hardcoat composition of claim 1.

5. A thermoplastic substrate in accordance with claim 4, which is a polycarbonate substrate.

* * * * *